(12) United States Patent
McDonnell (10) Patent No.: US 9,752,790 B2
(45) Date of Patent: Sep. 5, 2017

(54) CONVERTIBLE HUMIDIFIER

(71) Applicant: Great Innovations, LLC, Miramar, FL (US)

(72) Inventor: Joseph A. McDonnell, Weston, FL (US)

(73) Assignee: GREAT INNOVATIONS, LLC, Miramar, FL (US)

( * ) Notice: Subject to any disclaimer, the term of this patent is extended or adjusted under 35 U.S.C. 154(b) by 253 days.

(21) Appl. No.: 14/032,363

(22) Filed: Sep. 20, 2013

(65) Prior Publication Data

US 2014/0084495 A1 Mar. 27, 2014

Related U.S. Application Data

(60) Provisional application No. 61/704,143, filed on Sep. 21, 2012.

(51) Int. Cl.
*F24F 6/14* (2006.01)
*F24F 6/00* (2006.01)

(52) U.S. Cl.
CPC .......... *F24F 6/14* (2013.01); *F24F 2006/008* (2013.01); *Y02B 30/545* (2013.01)

(58) Field of Classification Search
CPC ......... F24F 6/14–6/16; F24F 2006/008; Y02B 30/545
USPC ....................................................... 261/78.2
See application file for complete search history.

(56) References Cited

U.S. PATENT DOCUMENTS

| | | | | |
|---|---|---|---|---|
| 3,188,007 A | * | 6/1965 | Myklebust | F24F 6/16 239/215 |
| 3,561,444 A | * | 2/1971 | Boucher | A61M 15/0085 128/200.16 |
| 3,864,440 A | * | 2/1975 | Giocoechea | A61M 16/16 128/200.13 |
| 4,113,809 A | * | 9/1978 | Abair | A61M 15/0085 128/200.16 |
| 4,621,632 A | * | 11/1986 | Bartels | A61M 16/1075 128/203.17 |
| 4,776,990 A | * | 10/1988 | Verity | B05B 7/162 128/200.16 |

(Continued)

OTHER PUBLICATIONS

Safety 1st 360 Ultrasonic Humidifier evidenced by "Safety 1st 360 Ultrasonic Humidifier Unboxing and Review (HD)," https://www.youtube.com/watch?v=NVIxmzuIN18, uploaded Nov. 28, 2011, last visited Oct. 1, 2015.*

(Continued)

*Primary Examiner* — T. Bennett McKenzie
(74) *Attorney, Agent, or Firm* — Bass, Berry & Sims, PLC (57) ABSTRACT

A convertible humidifier that includes a base portion that produces mist, a control panel that controls the production of the mist by the base portion, a reservoir, detachably connectable to the base portion, which holds water to be used by the base portion to produce the mist, and a nozzle configured to direct the mist. The reservoir includes a pass-through connection that allows the mist produced by the base portion to be directed to an opening on a top surface of the reservoir. The nozzle is detachably connected to the opening on the top surface in a first operation mode, and the nozzle is detachably connected to an extending portion, which is detachably connected to the opening on the top surface, in a second operation mode.

6 Claims, 14 Drawing Sheets

(56) References Cited

U.S. PATENT DOCUMENTS

| | | | | |
|---|---|---|---|---|
| 5,551,416 | A | * | 9/1996 | Stimpson .......... A61M 15/0085 128/200.14 |
| 6,275,652 | B1 | * | 8/2001 | Chauviaux .............. F24F 6/025 261/142 |
| 2005/0252995 | A1 | * | 11/2005 | Westphal et al. ............. 239/532 |
| 2008/0028775 | A1 | * | 2/2008 | Ausseil et al. .................... 62/91 |
| 2008/0099934 | A1 | * | 5/2008 | Chang ............................ 261/75 |
| 2008/0169575 | A1 | * | 7/2008 | Chen et al. ..................... 261/28 |
| 2009/0174088 | A1 | * | 7/2009 | Wegner .................... F24F 6/14 261/72.1 |
| 2011/0226868 | A1 | * | 9/2011 | Modlin ................ A01M 1/205 239/102.1 |
| 2012/0272955 | A1 | | 11/2012 | Cool et al. |

OTHER PUBLICATIONS

Safety 1st 360 Ultrasonic Humidifier, evidenced by Safety 1st 360 Ultrasonic Humidifier Unboxing and Review (HD), https://www.youtube.com/watch?v=NVIxmzuIN18, uploaded Nov. 28, 2011, last visited Oct. 1, 2015 (hereinafter "Safety 1st").*

Safety 1st 360 Ultrasonic Humidifier Unboxing and Review (HD), https://www.youtube.com/watch?v=NVIxmzuIN18, uploaded Nov. 28, 2011, last visited Oct. 1, 2015.*

Office Action dated Sep. 29, 2016 in related U.S. Appl. No. 14/949,753 (20 pages total).

* cited by examiner

CONVERTIBLE HUMIDIFIER

CROSS REFERENCE TO RELATED APPLICATIONS

This is a non-provisional patent application of U.S. Provisional Patent Application No. 61/704,143, filed Sep. 21, 2012, the entire contents of which are hereby incorporated by reference.

FIELD OF THE INVENTION

The present invention relates to a convertible humidifier that is configured to humidify an area from the floor or an elevated space, such as a tabletop or desk.

BACKGROUND OF THE INVENTION

Humidifiers provide humidity to a room or a given area near the humidifier. Typically, humidifiers are designed to be placed in one particular type of place. For example, humidifiers that are designed to be placed on a floor have a set height to provide humidity from the ground to the desired level. Likewise, humidifiers that are designed to be placed on an elevated surface, such as a table or desk, have a different height than a floor humidifier to provide humidity from the elevated surface to a desired level. However, floor humidifiers and humidifiers for elevated surfaces cannot readily exchange locations and provide humidity at a desired level.

Accordingly, it is desirable to provide one humidifier that can be used at multiple locations and still provide humidity at a desired level.

SUMMARY OF THE INVENTION

The present invention relates to a humidifier that can be used on an elevated surface, such as a tabletop or desk, and on the floor. A detachable extending portion allows the humidifier to be converted from a tabletop or desktop humidifier into a floor standing humidifier. The detachable extending portion allows the humidity produced by the humidifier to be released at an increased height that puts the moisturizing mist where a user needs it for use throughout a room.

In one embodiment of the present invention, a convertible humidifier includes a base portion that produces mist, a control panel that controls the production of the mist by the base portion, a reservoir detachably connectable to the base portion, which holds water to be used by the base portion to produce the mist, and a nozzle configured to direct the mist. The reservoir includes a pass-through connection that allows the mist produced by the base portion to be directed to an opening on a top surface of the reservoir, the nozzle is detachably connected to the opening on the top surface in a first operation mode, and the nozzle is detachably connected to an extending portion, which is detachably connected to the opening on the top surface, in a second operation mode.

There has thus been outlined, rather broadly, an embodiment of the present invention in order that the detailed description thereof herein may be better understood, and in order that the present contribution to the art may be better appreciated. There are, of course, additional embodiments of the present invention that will be described below and which will form the subject matter of the claims appended hereto.

In this respect, before explaining at least one embodiment of the present invention in detail, it is to be understood that the present invention is not limited in its application to the details of construction and to the arrangements of the components set forth in the following description or illustrated in the drawings. The present invention is capable of embodiments in addition to those described and of being practice and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, method, and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

The invention will now be described with reference to the drawing figures, in which like reference numerals refer to like parts throughout.

An embodiment in accordance with the present invention provides a convertible humidifier that can be used on an elevated surface, such as a tabletop or desk, and on the floor. A detachable extending portion allows the humidifier to be converted from a tabletop or desktop humidifier into a floor standing humidifier. The detachable extending portion allows the humidity produced by the humidifier to be released at an increased height that puts the moisturizing mist where a user needs it for use throughout a room.

Figure 10:
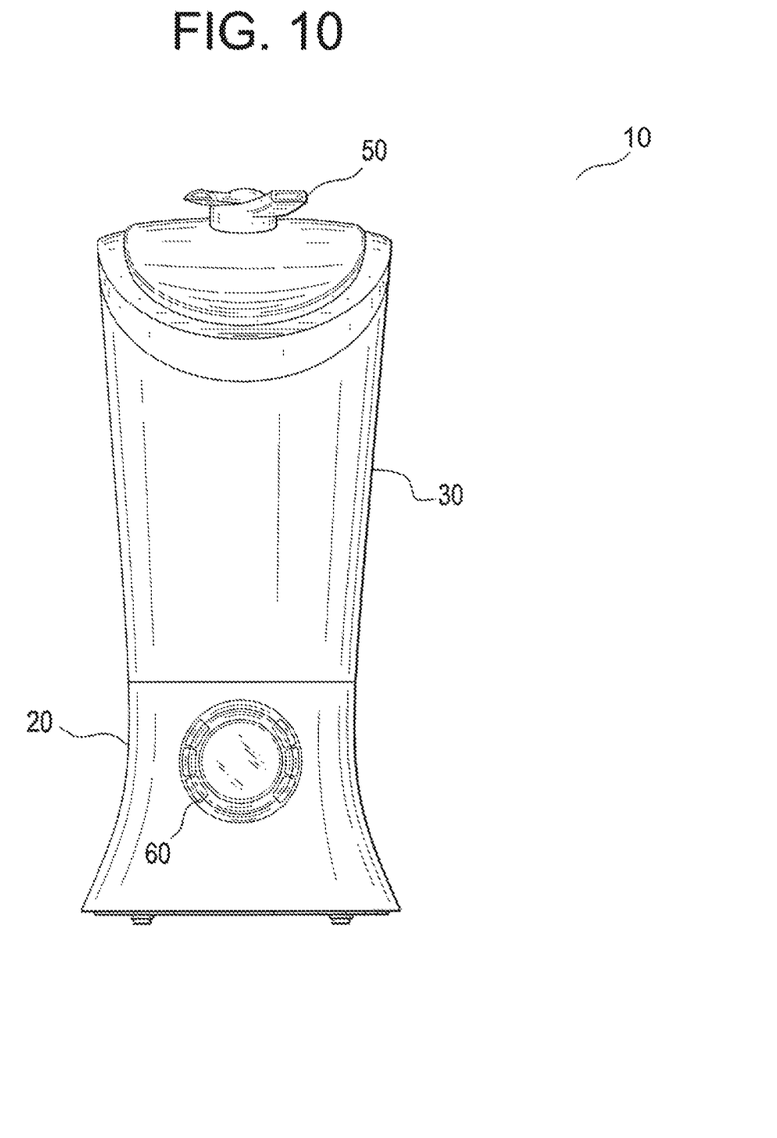
FIG. 10 is a front plan view of the convertible humidifier in a first operation mode according to an embodiment of the present invention.
Figure 11:
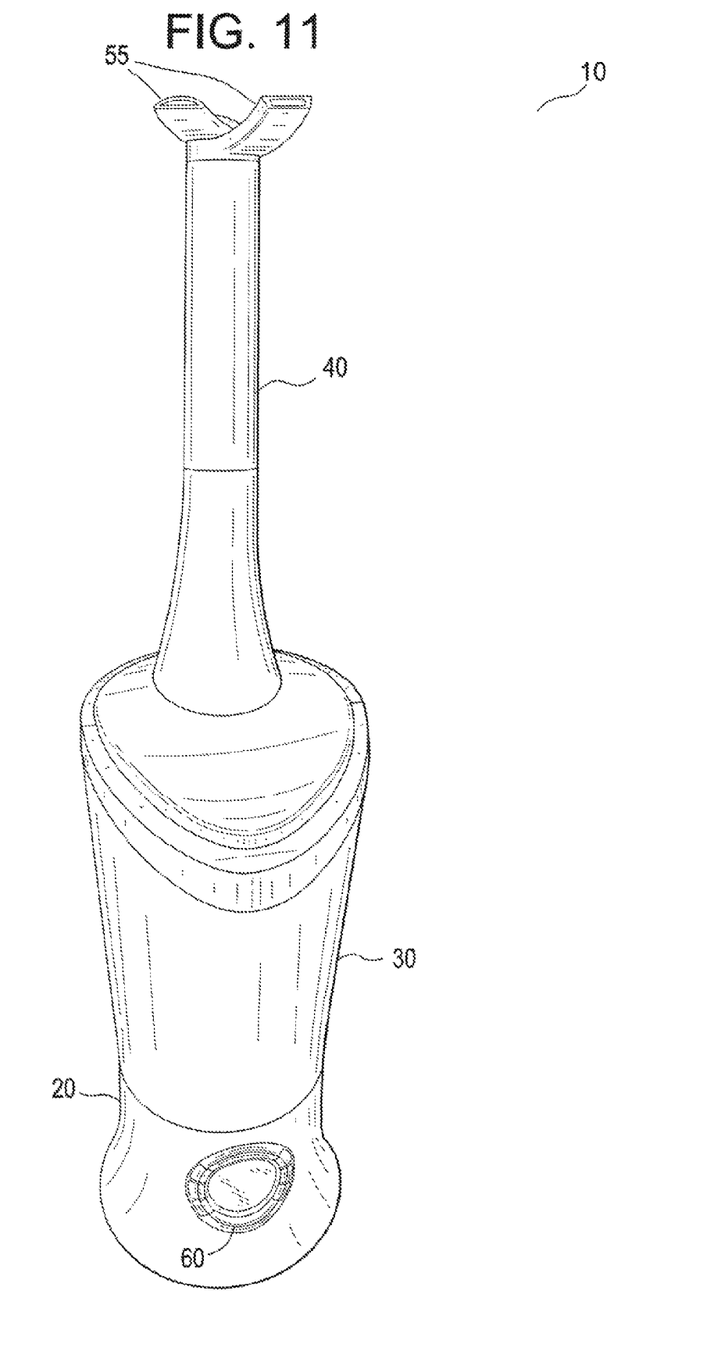
FIG. 11 is a perspective view of the convertible humidifier in a second operation mode according to an embodiment of the present invention.
Figure 12:
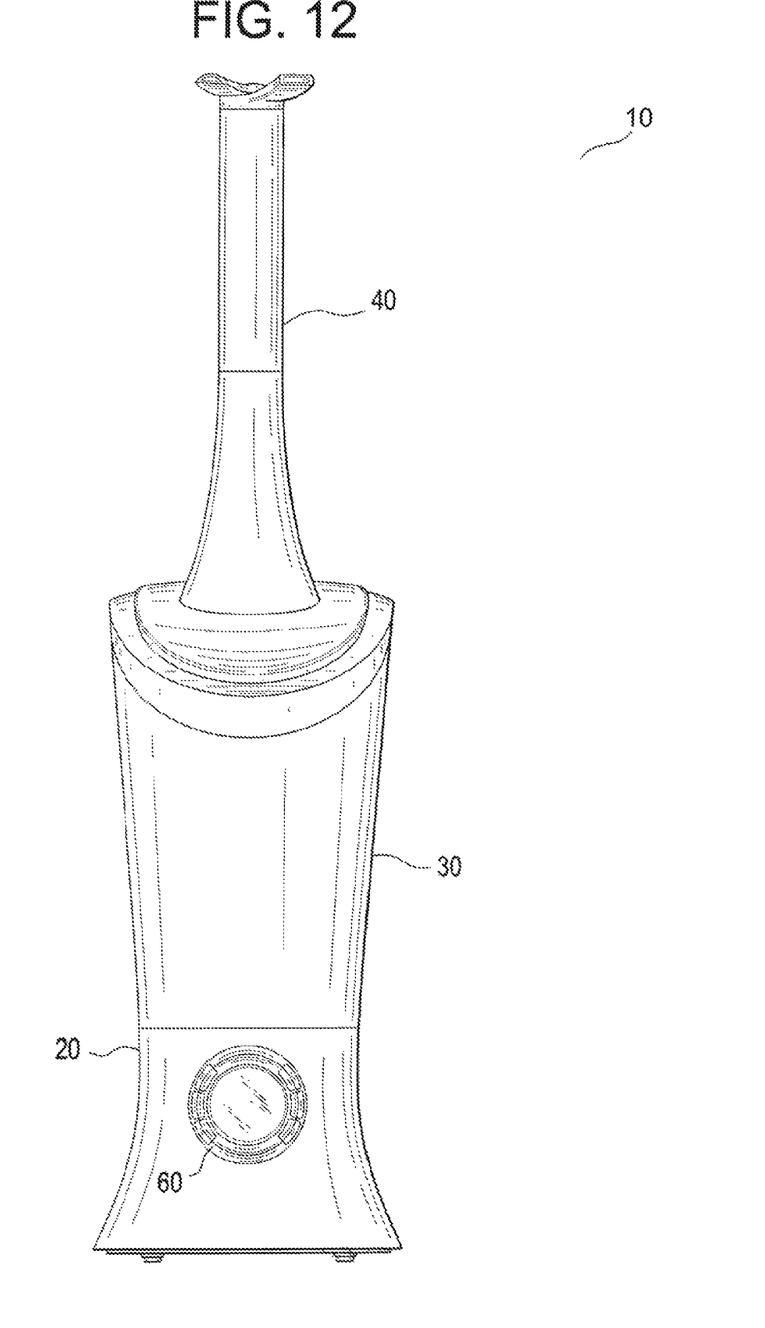
FIG. 12 is a front plan view of the convertible humidifier in the second operation mode according to an embodiment of the present invention.

FIGS. 10, 11, and 12 show a views of a convertible humidifier 10 in accordance with one exemplary embodiment of the present invention. The convertible humidifier 10 includes a base portion 20, a control panel 60, a reservoir 30, a detachable extending portion 40, and a nozzle 50. In the present embodiment, the base portion 20 includes the control panel 60. However, the control panel 60 may be included in the reservoir 30 or be a separate unit, such as a wired or wireless remote control.

In this exemplary embodiment, as show in FIGS. 1, 2, 15, 19, and 20, the base portion 20 houses electronics 200 used by the convertible humidifier 10 that produce mist and the electronics 200 used by the control panel to control the production of mist. The base portion 20 is connected to a power source (not shown) to provide power to the electronic components 200 of the convertible humidifier 10. According to this embodiment, the base portion 20 produces mist by ultrasonic nebulization, but any other known mist producing method may also be used.

Figure 1:
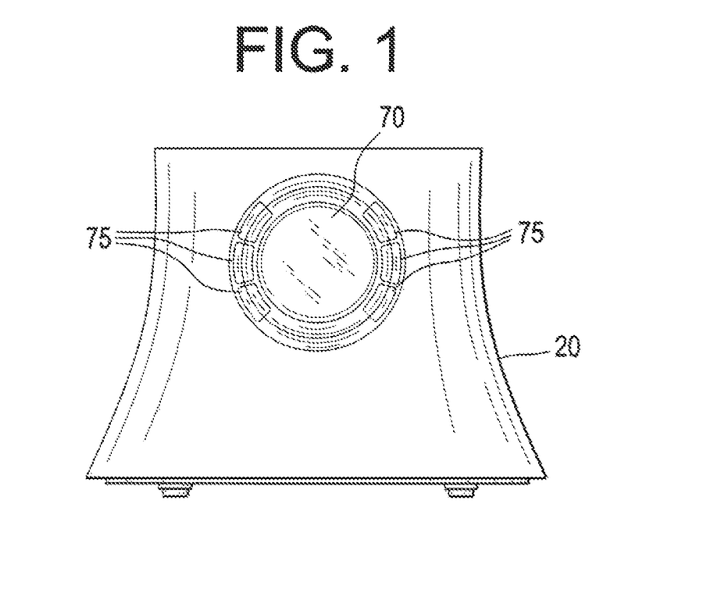
FIG. 1 is a front plan view of the base portion according to an embodiment of the present invention.
Figure 2:
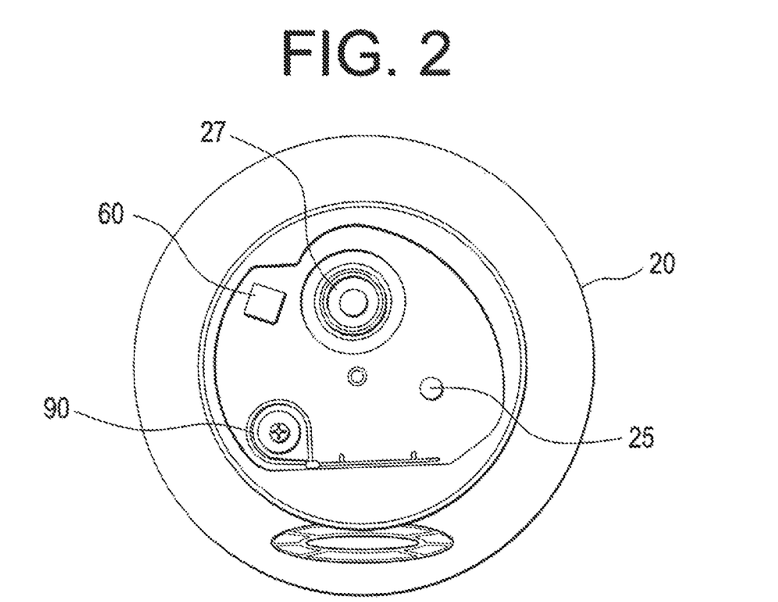
FIG. 2 is a top plan view of the base portion according to an embodiment of the present invention.
Figure 15:
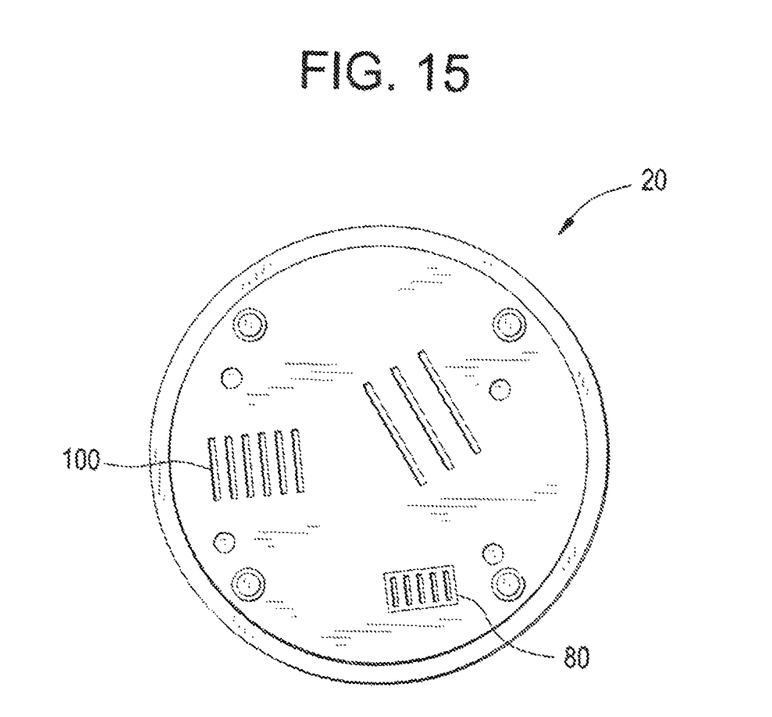
FIG. 15 is a bottom plan view of the base portion according to an embodiment of the present invention.
Figure 19:
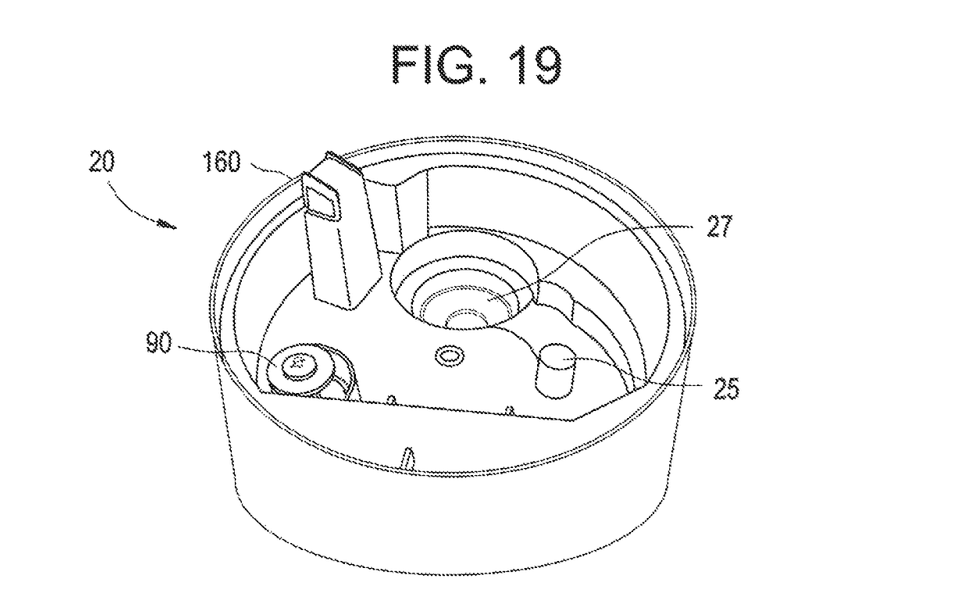
FIG. 19 is a perspective view of the base portion according to an embodiment of the present invention.

As also shown in FIGS. 2, 15, and 19, the base portion 20 includes the control panel 60 and a mist producing unit 27. The base portion 20 may also include a humidistat 80 for determining the ambient humidity in the surrounding environment, a water sensor 90 for determining whether water is present in the reservoir 30 of the convertible humidifier 10, an air outlet 160 that assists in the flow of mist from the base portion 20, and/or a speaker 100 for providing audible information. The base portion 20 may also include an engaging member 25 which makes contact with a movable membrane 125 of a tank cap 120, as discussed below.

The air outlet 160 may include a fan 180 that assists in the control of the flow of mist from the base portion 20 and through the reservoir 30. The fan of the air outlet 160 may be controlled by the control panel 60.

Figure 20:
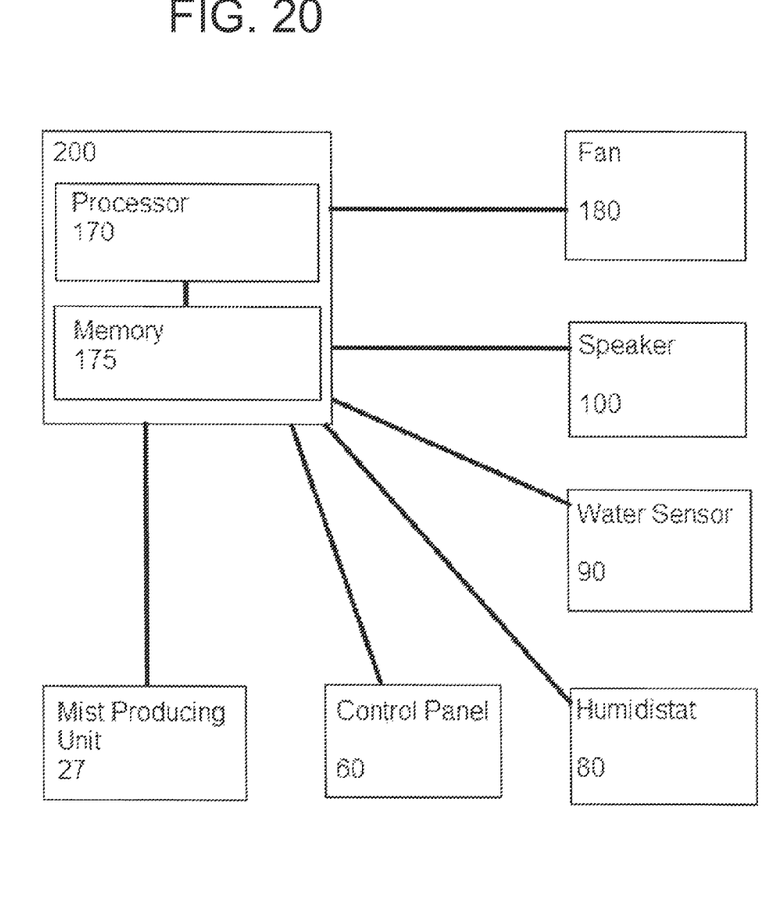
FIG. 20 is a schematic of the electronics housed in the base portion according to an embodiment of the present invention.

As shown in FIG. 20, the electronics 200 housed in the base portion 20 may include a processor 170 and a memory 175. The processor 170 and memory 175 are electronically connected to the mist producing unit 27, the control panel 60, humidistat 80, water sensor 90, speaker 100, and fan 180. The processor 170 and memory 175 control the operation of the convertible humidifier 10 and execute the various functions of the convertible humidifier 10, as discussed below.

Figure 3:
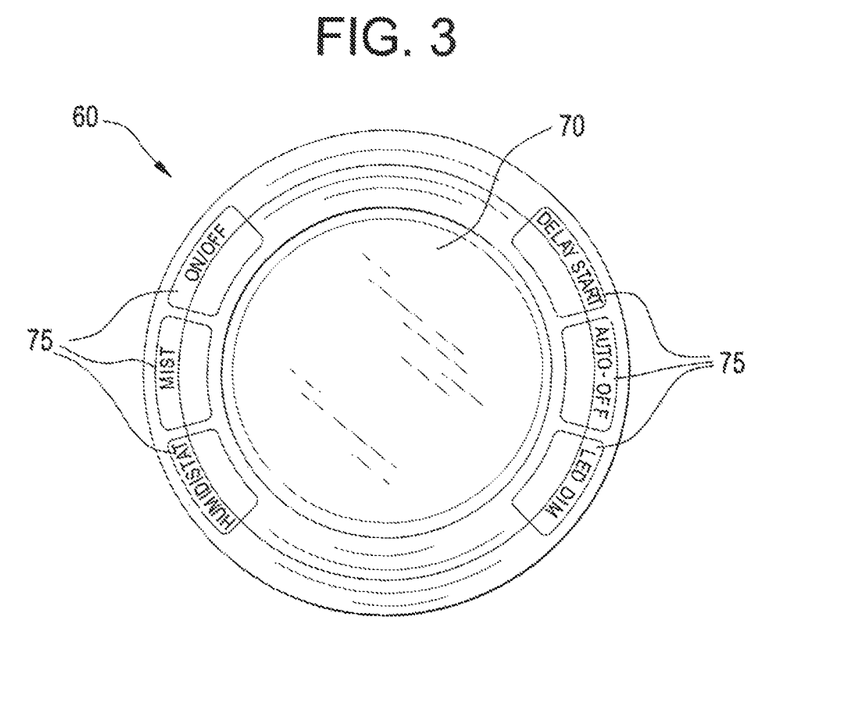
FIG. 3 is a front plan view of the control panel according to an embodiment of the present invention.
Figure 4:
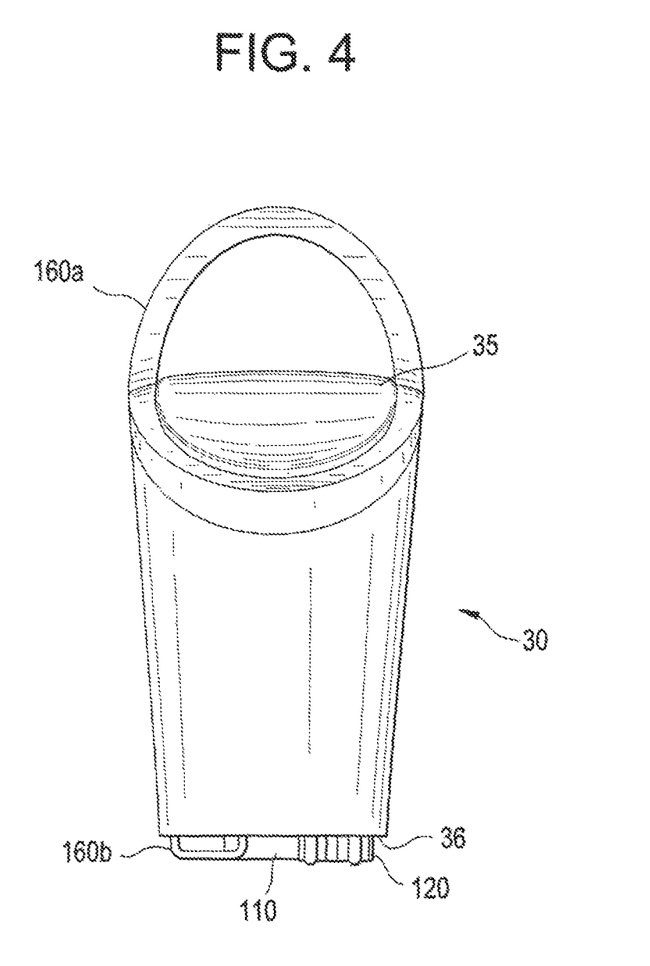
FIG. 4 is a front plan view of the reservoir according to an embodiment of the present invention.
Figure 5:
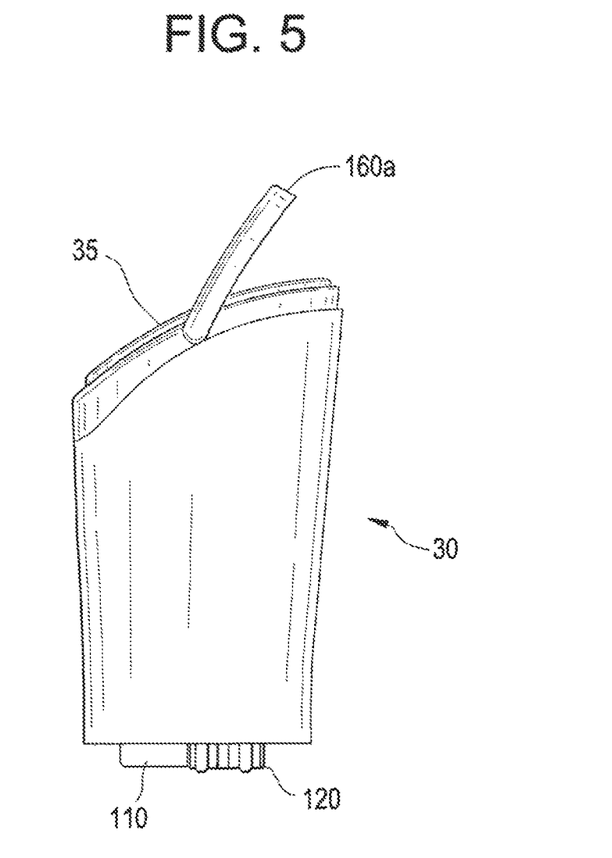
FIG. 5 is a side plan view of the reservoir according to an embodiment of the present invention.

As shown in FIG. 3, control panel 60 is used for operation of the convertible humidifier 10. The control panel 60 may include a display 70 for the displaying of information about the convertible humidifier 10 and one or more buttons 75 for operation of the convertible humidifier 10. Functions of the one or more buttons 75 include the ability to turn on and turn off the convertible humidifier 10, delay the start of the convertible humidifier 10, automatically turn off the convertible humidifier 10, control the output level of mist of the convertible humidifier 10, set a relative humidity level desired, and dim the display 70.

A delay start function allows programming of the convertible humidifier 10 to turn on automatically. By using the one or more buttons 75 on the control panel 60, a user may enter the time, which may be displayed on the display 70. Once the delay start time is entered, the convertible humidifier 10 may provide acknowledgement of the entry by, for example, flashing the delay start time on the display 70, beeping from a speaker 100 that is provided in the base portion 20, or both. The display 70 may also show a countdown time until the convertible humidifier 10 turns on.

An automatic turn off (auto-off) function allows programming of the convertible humidifier 10 to turn off automatically. By using the one or more buttons 75 on the control panel 60, a user may enter the time, which may be displayed on the display 70. Once the auto-off time is entered, the convertible humidifier 10 may provide acknowledgement of the entry by, for example, flashing the auto-off time on the display 70, beeping from a speaker 100 that is provided in the base portion 20, or both. The display 70 may also show a countdown time until the convertible humidifier 10 turns off. The delay start function and auto-off function may also be used in conjunction with one another.

A mist output function allows programming of the output level of mist of the convertible humidifier 10. By using the one or more buttons 75 on the control panel 60, a user increase and decrease the amount of mist produced by the convertible humidifier 10. The air outlet 160 increases the air flow from the base portion 20 as the desired output level of mist increases. The air flow from air outlet 160 allows the mist produced by the base portion to be direct through the reservoir 30.

The convertible humidifier 10 may have a low setting, a medium setting, a high setting, a supreme setting, and a turbo setting, which can be set by using the one or more buttons 75. In one embodiment of the present invention the turbo setting may have a default operational setting where the convertible humidifier 10 outputs mist at the highest level for a predetermined period of time, and then output mist at the next highest level (supreme setting) after the predetermined period of time has elapsed. Further, the default operational setting may prevent the use of the highest level (turbo setting) for a predetermined period of time.

A relative humidity level function allows programming of the convertible humidifier 10 to turn off and turn on automatically to maintain a predetermined humidity. By using the one or more buttons 75 on the control panel 60, a user may enter a desired humidity level, which may be displayed on the display 70. Once the desired humidity level is entered, the convertible humidifier 10 may provide acknowledgement of the entry by, for example, flashing the desired humidity level on the display 70, beeping from a speaker 100 that is provided in the base portion 20, or both. The display 70 may also alternate between showing the ambient humidity in the surrounding environment and the desired humidity level. The humidistat 80 is used to determine the ambient humidity in the surrounding environment of the convertible humidifier 10. The ambient humidity determined by the humidistat 80 is compared with the desired humidity level. If the ambient humidity and the desired humidity are about the same, the convertible humidifier automatically turns off. When the ambient humidity and the desired humidity differ by a predetermined amount, the convertible humidifier 10 automatically turns on.

A dim function allows the display 70 of the convertible humidifier 10 to be turned off and turned on during operation of the convertible humidifier 10. By using the one or more buttons 75 on the control panel 60, a user may press a dim function button to turn off the display 70, and may press any of the one or more buttons 75 to turn on the display 70.

An automatic safety shut-off function allows for the convertible humidifier 10 to automatically turn the mist production off when the water sensor 90 determines that there is no water present. The convertible humidifier 10 may also turn off completely when the water sensor 90 determines that there is no water present. If the water sensor 90 determines that there is no water present, the display 70 may also indicate that there is no water present. The speaker 100 may also provide audible information about the waterless state of the reservoir 30 by beeping.

Figure 16:
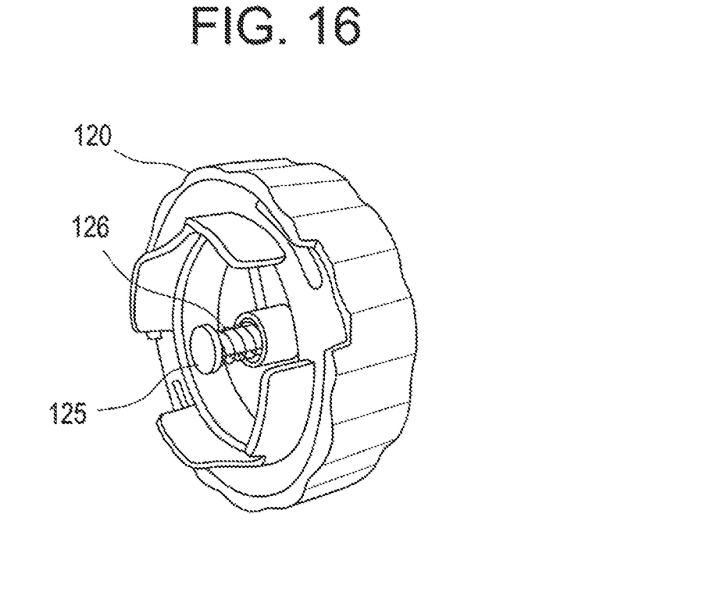
FIG. 16 is a bottom perspective view of the tank cap according to an embodiment of the present invention.
Figure 17:
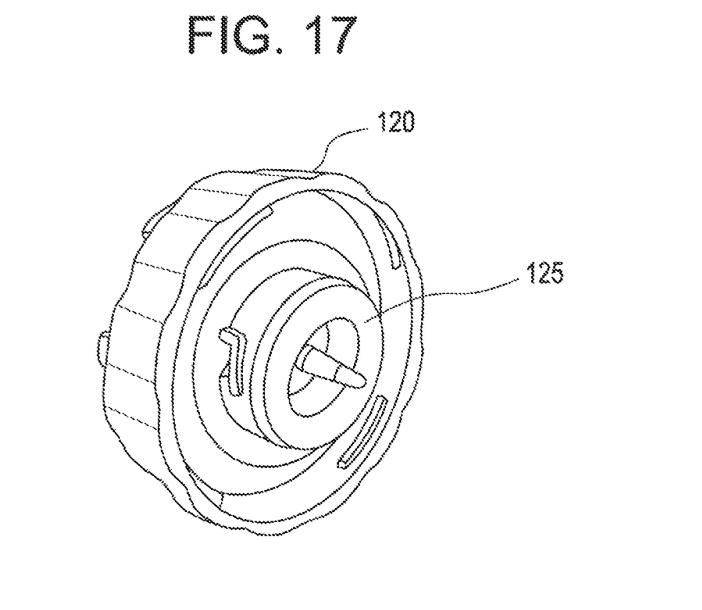
FIG. 17 is a top perspective view of the tank cap according to an embodiment of the present invention.

FIGS. 4, 5, 6, 7, and 14 show views of the reservoir 30 of the convertible humidifier 10 in accordance with one exemplary embodiment of the present invention. The reservoir 30 holds water used by the base portion 20 to produce mist, and the reservoir 30 is detachable from the base portion 20. The reservoir 30 includes a tank 110, the tank cap 120, and a pass-through connection 130. The tank 110, as shown in FIGS. 16 and 17, of reservoir 30 holds the water for use by the base portion 20 to produce mist. Tank cap 120 is removable from the tank 110 and allows for easy filling of water into the tank 110. Tank cap 120 may also be used in supplying base portion 20 with water when reservoir 30 is connected to base portion 20. As shown in FIGS. 16 and 17, the tank cap 120 may include a movable membrane 125 that when contacted to the engaging member 25 of base portion 20 allows water to from the tank 110 to the base portion 20. The moveable membrane 125 may be kept in a sealed position by a spring 126 or other retaining method when the reservoir 30 is not connected to the base portion 20. When the reservoir 30 is connected to the base portion 20, the spring 126 comes in contact with the engaging member 25 of the base portion 20 and the movable membrane 125 opens to allow the flow of water to the base portion 20.

Figure 18:
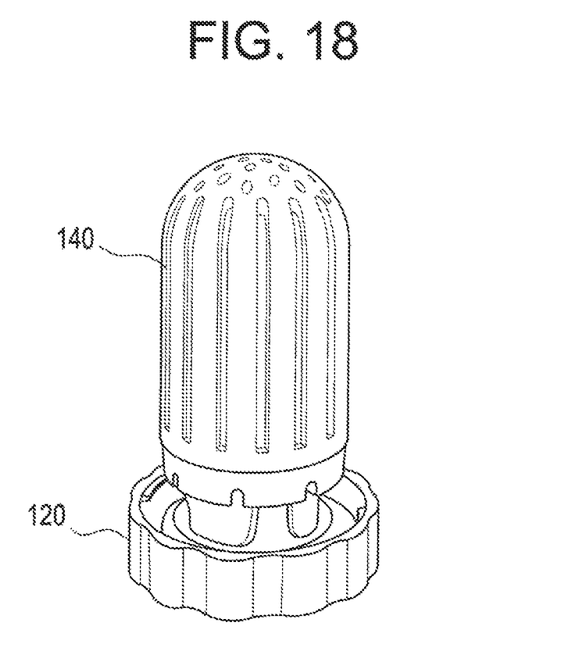
FIG. 18 is another perspective view of the tank cap according to an embodiment of the present invention.

As showing in FIG. 18, a detachable filter 140 may also be removably connected to tank cap 120 to filter the water used by the base portion 20 in production of mist. The detachable filter 140 may be a permanent filter or a replaceable filter. The detachable filter 140 may also be an antibacterial filter, a demineralization, an antibacterial and demineralization filter, or any other known water type filters.

The reservoir 30 may also be provided with a handle 160a on a top surface 35. The handle 160a may be used to assist in attaching and detaching of the reservoir 30 from the base portion 20 to ensure a good connection between the reservoir 30 and the base portion 20. As show in FIGS. 4 and 5, the handle 160a may also be built into the top surface 35 of the reservoir 30 and hingedly connect with the reservoir 30 in order to be stored on the top surface 35 when not in use. A handle 160b may also be provided on a bottom surface 36 of the reservoir 30. Handle 160b may be used when filling the tank 110 with water.

Figure 6:
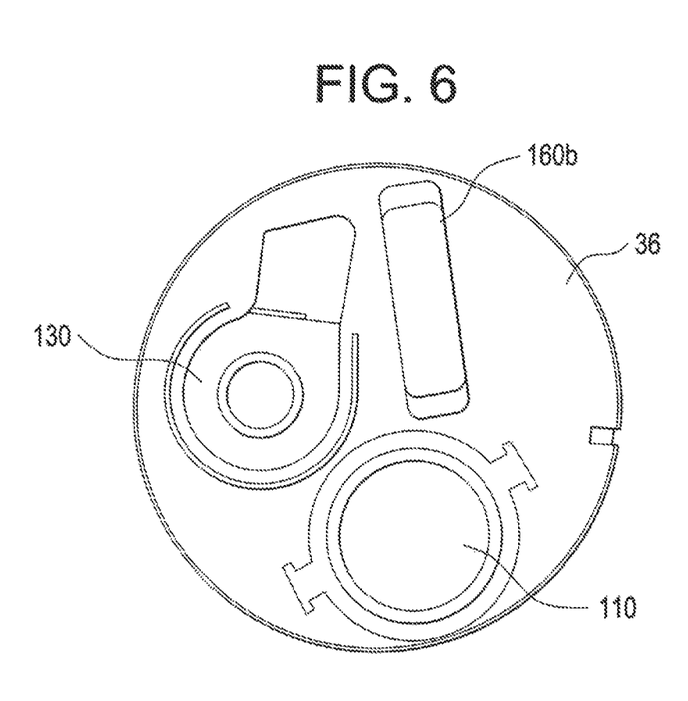
FIG. 6 is a bottom plan view of the reservoir according to an embodiment of the present invention.
Figure 7:
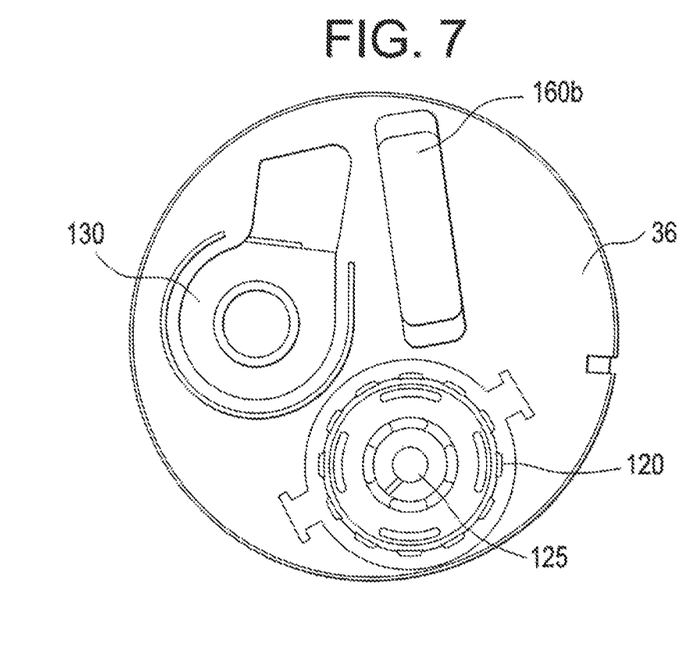
FIG. 7 is another bottom plan view of the reservoir according to an embodiment of the present invention.
Figure 13:
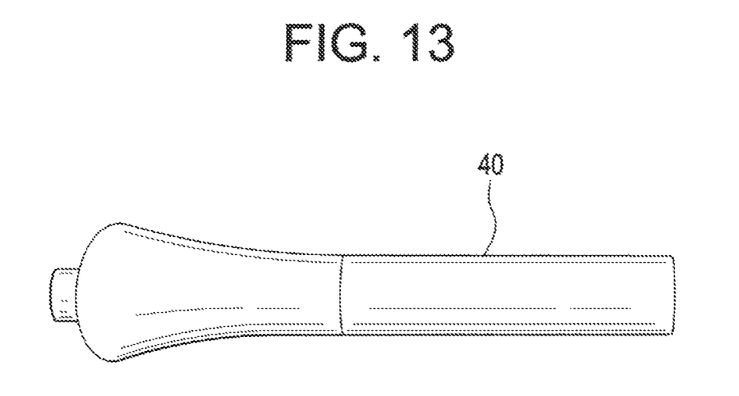
FIG. 13 is a front plan view of the extending portion according to an embodiment of the present invention.
Figure 14:
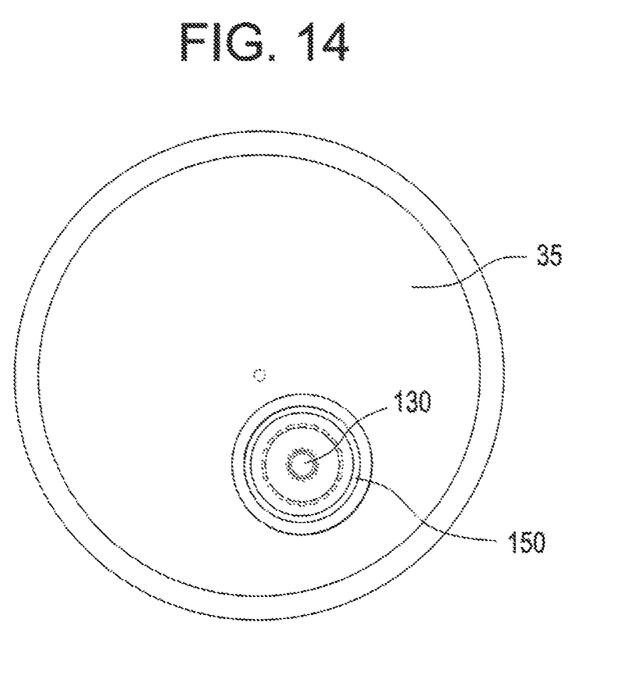
FIG. 14 is a top plan view of the reservoir according to an embodiment of the present invention.

As also shown in FIGS. 6, 7, and 14, the reservoir 30 includes the pass-through connection 130. The pass-through connection 130 allows the mist produced by the base portion 20 to be directed (flow) through the reservoir 30 to opening 150 on the top surface 35 of the reservoir 30 where the mist exits the convertible humidifier 10. A fan provided in air outlet 160 assists in the flow of mist produced in the base portion 30 through the pass-through connection 130. When the convertible humidifier 10 is in the second operation mode, the flow of mist continues through the extending portion 40. FIG. 13 shows a view of extending portion 40.

FIG. 10 shows a first operation mode in which nozzle 50 is connected to opening 150 on the top surface 35. When in the first operation mode, the convertible humidifier 10 may be used on elevated surfaces, such as a tabletop or a desktop, to provide mist at a user desired location and level. Nozzle 50 is removable from the opening 150. When in the first operational mode, mist produce in the base portion 20 is directed through pass-through connection 130 and out of nozzle 50.

FIGS. 11 and 12 show a second operation mode in which extending portion 40 is connected to opening 150 on the top surface 35 and nozzle 50 is connected to extending portion 40. When in the second operation mode, the convertible humidifier 10 may be used on lower surfaces, such as a floor, while being able to provide mist at a user desired location and level. The same nozzle 50 from the first operation mode may be used with the extending portion 40. When in the second operational mode, mist produce in the base portion 20 is directed through pass-through connection 130, through extending portion 40, and out of nozzle 50.

Figure 8:
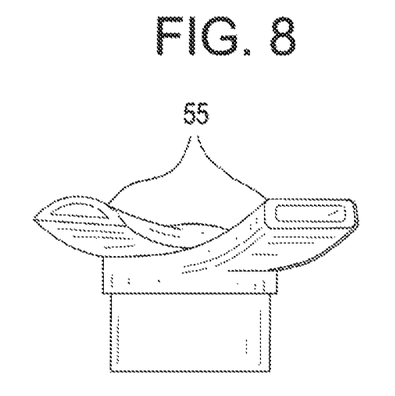
FIG. 8 is a front plan view of the nozzle according to an embodiment of the present invention.
Figure 9:
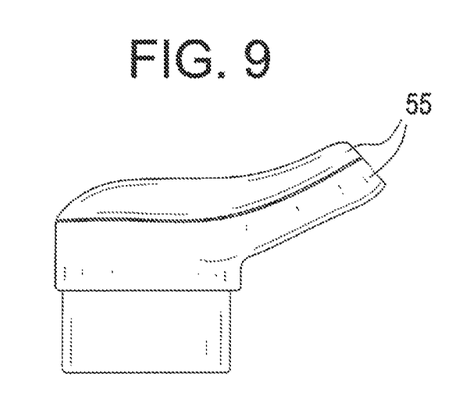
FIG. 9 is a side plan view of the nozzle according to an embodiment of the present invention.

As shown in FIGS. 8 and 9, nozzle 50 is configured to direct the mist to a desired location. Once the nozzle 50 is detachably connected to the opening 150 in a first operation mode or to the extending portion 40 in the second operation mode, a plurality of movable nozzle openings 55 may be configured to direct the flow of mist in a plurality of directions. The moveable nozzle openings 55 may be configured to direct mist in substantially the same direction, as shown in FIG. 9. The moveable nozzle openings 55 may be configured to direct mist in a plurality of different directions, as shown in FIG. 8.

In another embodiment of the present invention, the electronics 200 determines when the convertible humidifier 10 is in the first mode or when in the second mode by, for example, detecting the connection of the extending portion 40 to the reservoir 30. When the second mode, the mist output may increase to the turbo setting automatically. In an alternative embodiment, the mist output may remain at the current mist output setting until a user manual sets the mist output function after the convertible humidifier 10 is detected to be in the second mode. In another embodiment of the present invention, the detection of the ambient humidity by the humidistat 80 is adjusted, when the electronics 200 detects the convertible humidifier 10 is in the second mode, in order to compensate for the increased distance of the mist output from the humidistat 80.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A humidifier, comprising:
   a base portion including an ultrasonic mist generator;
   a fluid reservoir configured to hold fluid to be used by the ultrasonic mist generator, the fluid reservoir including a top surface and a bottom surface, wherein the top surface comprises an opening and wherein said bottom surface comprises a tank cap and a pass-through connection, said fluid reservoir being removably connected to said base portion such that fluid in the reservoir can be delivered to the base through the tank cap where the fluid can be converted to a mist by the ultrasonic mist generator and then delivered through the pass-through connection toward the opening on the top surface of the reservoir;
   a movable nozzle for disbursing the mist; and
   an elongated tube comprising a first end and a second end;
   wherein the humidifier is configured to operate in a first or a second operation mode;
   wherein in the first operation mode, the nozzle is directly connected to the opening in the top surface in the reservoir and the elongated tube is not attached to the humidifier; and
   in the second operation mode, the first end of the elongated nozzle is directly attached to the opening in the top surface of the reservoir while the nozzle is connected to the second end of the elongated tube such that the elongated tube extends above the top end of the reservoir, wherein the same nozzle is used in the first and second operation modes.

2. The humidifier as recited in claim 1, further comprising a processor for controlling the operation of the humidifier.

3. The humidifier as recited in claim 2, wherein the processor is configured to control the output level of mist produced by the humidifier.

4. The humidifier as recited in claim 2, wherein the processor is configured for monitoring ambient humidity outside the humidifier to selectively adjust the operation for the humidifier to achieve desired humidity levels outside the humidifier.

5. The humidifier as recited in claim 1, wherein the nozzle has at least two openings for directing mist from said elongated tube.

6. The humidifier as recited in claim 5, wherein the at least two openings are each selectively and independently rotatable around a longitudinal axis of the nozzle.

* * * * *